May 29, 1923.

C. W. LUHR

RESILIENT GEARING

Filed Nov. 10, 1920

Witnesses:
N. L. Fisher
William A. Hardy

Inventor:
Charles W. Luhr
by Delos Holden

Patented May 29, 1923.

1,456,700

UNITED STATES PATENT OFFICE.

CHARLES W. LUHR, OF WEST ORANGE, NEW JERSEY, ASSIGNOR TO NEW JERSEY PATENT COMPANY, OF WEST ORANGE, NEW JERSEY, A CORPORATION OF NEW JERSEY.

RESILIENT GEARING.

Application filed November 10, 1920. Serial No. 423,094.

*To all whom it may concern:*

Be it known that I, CHARLES W. LUHR, a citizen of the United States, and a resident of West Orange, in the county of Essex and State of New Jersey, have invented certain new and useful Improvements in Resilient Gearing, of which the following is a description.

My invention relates to resilient gearing and, while not limited in its application thereto, is especially directed to resilient worm gears designed for use in driving certain parts of phonograph or similar sensitive mechanisms which are operated at high speeds, such as speed regulators or governors for such mechanisms.

The principal object of my invention is to provide an improved resilient, elastic or yieldable gear, preferably a worm gear, which will insure a sufficient yielding or flexibility under the pressure exerted on the teeth thereof, by reason of its engagement with the cooperating gear or worm, to practically eliminate all vibration and noise and thus obtain a smooth running, substantially noiseless gearing.

More specifically described, my improved gear comprises a body portion built up from a plurality of superposed, contiguous, thin, flat plates or laminations of hard material, such as phosphor bronze, rigidly secured together at their central portions but free at their peripheral edge portions, and having registering gear or worm teeth cut or formed therein, the laminations being sufficiently thin to yield or bend resiliently at right angles to their planes under the lateral pressure exerted on their teeth by the cooperating gear or worm. Where the gear is a helical or a worm gear, the teeth are cut or formed in an oblique direction across the laminations and, accordingly, the yielding of the laminations in a direction at right angles to their planes will effect a slight relative movement of the corresponding teeth of the laminations in the direction of rotation thereof sufficient to compensate for all unevenness in the surfaces of these teeth, as well as in the surfaces of the teeth of the cooperating gear. Consequently, all vibrations transmitted to gearing which include my improved resilient gear as one element thereof, will be absorbed, and as the laminations of the resilient gear are contiguous at their peripheral portions as well as free and resilient, there will be no appreciable relative distortion of the teeth of the laminations thereof and no vibration or noise originating in the gearing, with the result that the latter will run smoothly and substantially noiselessly.

As stated above, my improved gear is especially designed for driving mechanisms, such as the high speed sensitive governor or speed regulator of a phonograph, or the like, in which the tendency to vibrate is quite pronounced, especially if the governor weights become displaced from their proper relative position, as frequently happens. When my gear is used for such purpose, all vibrations which originate in the governor and the noise which would usually result therefrom are ordinarily not transmitted through the gear, but are entirely eliminated or absorbed thereby. A phonograph user, however, is apt to attempt to start the instrument quickly when the same is held inoperative by the frictional engagement of the friction pad and friction disc of the governor, by giving the turn-table a sudden turn forward. Users of phonographs have also been known to frequently give the turn-table a sudden backward turn which, of course, would tend to wind the spring of the phonograph. In either case, if my improved gear is employed, and unless provision is made thereagainst, there would be great danger of the teeth on the gear being permanently deformed by the sudden heavy lateral thrust to which the same would be subjected. This would, of course, defeat the very purposes for which my gear is employed and would be likely to result in increasing the vibrations and noise and in seriously interfering with the proper operation of the phonograph or other mechanism. It is, therefore, a further object of my invention to provide in a gear of this character, means whereby any permanent deformation of the teeth of the laminations or thin plates of the gear by reason of the same being subjected to such sudden heavy lateral thrusts, will be effectually prevented.

Additional features of my invention will be hereinafter more fully described and claimed.

For a clearer understanding of my invention, attention is directed to the drawing accompanying and forming a part of this specification and in which.

Figure 1:
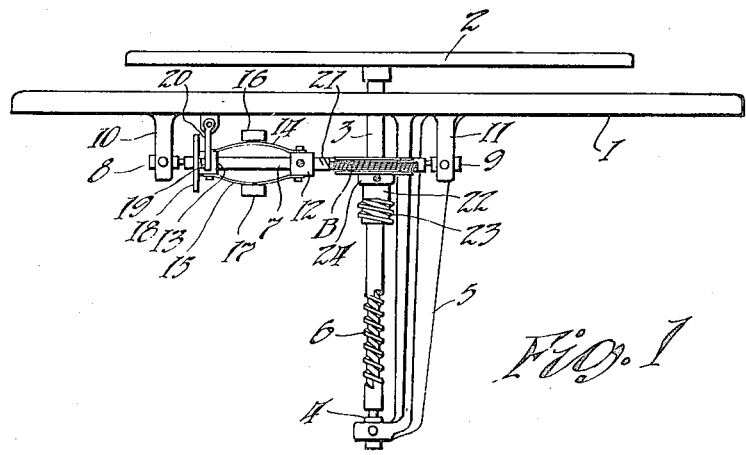
Figure 1 is a view in side elevation of the mechanism of an Edison disc phonograph, with parts omitted, illustrating the application thereto of a resilient gear constructed in accordance with my invention.
Figure 2:
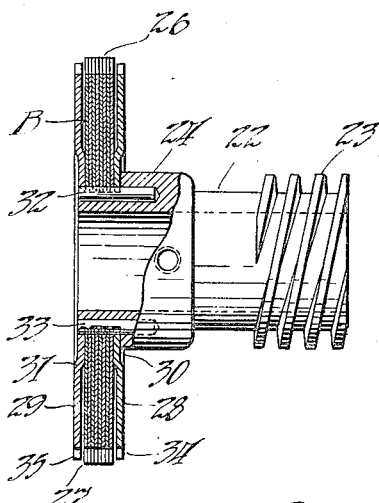
Fig. 2 is an enlarged view in elevation, partly in section, of my improved gear and the sleeve on which the same is mounted in the mechanism shown in Fig. 1.
Figure 3:
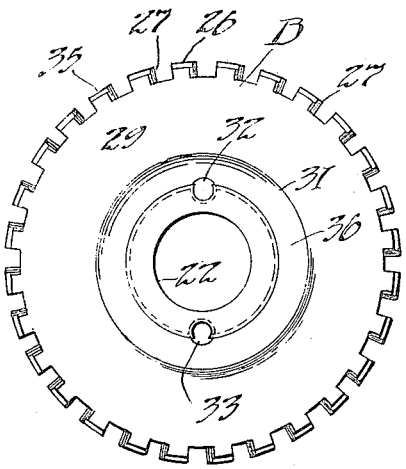
Fig. 3 is a view looking from the left in Fig. 2.

Referring to the drawing, and especially to Fig. 1, reference character 1 represents the top plate of an Edison disc phonograph, and 2 the turn-table or record support thereof mounted on the upper end of the usual vertical turn-table or driving shaft 3. The turn-table shaft 3 extends downwardly below the top plate 1 and is suitably supported at its lower end, as by means of a step-bearing 4, carried by the lower end of a bracket 5, the latter depending from the top plate 1. The turn-table shaft 3 has formed thereon the usual worm 6, which is adapted to be engaged by a worm wheel (not shown), actuated by a suitable motor (not shown) to drive the shaft.

The phonograph is provided with a centrifugal speed regulator or governor, this governor comprising a horizontal shaft 7 suitably supported at its ends on aligned pivot bearings 8 and 9 which are respectively mounted on brackets 10 and 11 depending from the top plate 1, a pair of collars or sleeves 12 and 13 mounted on the shaft 7, and bowed springs 14 and 15 having their ends respectively secured to said collars and respectively carrying centrifugal weights 16 and 17 intermediate their ends. The collar 12 is suitably secured as by means of a set screw to the shaft 7, while the collar 13 is free on the shaft 7 and carries a friction disc 18, with which a friction pad 19 mounted on the end of a pivoted arm 20 co-acts. The governor shaft 7 has formed thereon a worm 21 which is operatively engaged by the teeth of a resilient worm gear B constructed in accordance with my invention. The worm gear B is carried or mounted on a sleeve 22 suitably secured to the turn-table shaft 3, as by means of a set screw. The sleeve 22, as shown, has formed on its lower end portion a worm 23, which is adapted to operate mechanism (not shown) for effecting the feeding of the reproducer mechanism transversely of the turn-table 2.

The upper end portion of the sleeve or collar 22 is enlarged as indicated at 24, this enlargement constituting the hub of my improved gear. The body portion of the resilient gear B is built up from a plurality of thin, flat, circular plates or laminations 26, which are exactly alike and the peripheral portions of which are cut or otherwise formed with teeth 27. In the formation of the resilient gear shown, the teeth 27 of the laminations 26 are cut or formed obliquely across the laminations so that when the laminations are assembled the corresponding teeth thereof will form the teeth of a worm gear adapted to mesh properly with the teeth of the worm 21 on the governor shaft 7. The upper end portion of the hub 24 is reduced and the gear B is formed by superposing the laminations 26 in contiguous relation on such reduced end portion, such laminations being provided with central openings, in which the reduced end portion of the hub 24 fits closely. The gear B also comprises two heavy outer reinforcing plates 28 and 29, preferably formed of brass, and in assembling the gear the plate 28 is, of course, first mounted on the reduced end portion of the hub 24, then the laminations 26 are superposed on such reduced end portion, and finally the plate 29 is positioned on the end of the hub. The central portions of the reinforcing plates 28 and 29 are preferably dished towards each other, as indicated at 30 and 31 respectively, and the laminations and plates 28 and 29 are forced together on the hub 24 until the central portions thereof are in firm contact with each other. The inner edge of each of the laminations 26 and of the plates 28 and 29 is provided with a pair of diametrically opposed notches or curved recesses, and the hub 24 is provided with a pair of diametrically opposed cylindrical recesses with which the recesses in the laminations of the plates are respectively registered to form cylindrical openings. When this registration is effected, two cylindrical pins 32 and 33 are respectively driven into the cylindrical openings formed by the registering sets of recesses and serve to key the laminations 26 and reinforcing plates 28 and 29 together and rigidly to the hub 24 so as to prevent all rotary movement of such laminations and plates either with respect to each other or with respect to the hub. In order to further insure that the laminations 26 and reinforcing plates 28 and 29 shall be in contiguous relation and rigidly secured together at their central portions, the hub is peaned or spun over at its end as indicated at 36, so as to overlie the outer ends of the pins 32 and 33 and the inner edge portion of the reinforcing plate 29. The outer portions of the reinforcing plates 28 and 29 are preferably slightly spaced from the adjacent laminations 26, as shown, and are respectively provided at their peripheral portions with teeth 34 and 35, corresponding with the teeth 27 of the laminations 26 and registering with the latter when the laminations and reinforcing plates are assembled as shown. The root diameters of the toothed plates or laminations 26 and of the toothed reinforcing plates 28 and 29 are the same, but the teeth 34 and 35 of the plates 28 and 29 are slightly less in height than the teeth 27 of the laminations 26. The pitch diameter of the toothed plates or laminations 26 is equal to the outside diameter of these plates due to the fact that the gear B shown is a worm gear. Accordingly, as the teeth on the plates 28 and 29 are less in height than the teeth of the laminations 26, only the body portion of the gear B, that is the portion made up of the superposed laminations 26, will partake in the driving action. The purpose of the teeth 34 and 35 on the reinforcing plates 28 and 29 is to prevent deformation of the teeth 27 of the laminations 26 when the latter are subjected to sudden heavy lateral thrusts or strains, as explained above. The slight spacing of the outer portions of the reinforcing plates 28 and 29 from the built-up body portion of the gear consisting of the superposed laminations 26, permits sufficient lateral yielding of the contiguous peripheral free portions of such laminations to absorb all vibrations which may be transmitted to the gear B from the governor A, and to also compensate for variations and unevenness in the surfaces of the teeth of the worm gear B and the worm 21 engaged thereby, as well as for other slight variations which may exist in a mechanism such as shown, thus preventing the transmission of such vibrations by the gear B, the production of vibration in the gearing, and the elimination of substantially all noise.

While the teeth of the laminations 26 and the reinforcing plates 28 and 29 may be cut or formed prior to the assembling of the gear B, I find it advantageous to first assemble the laminations and reinforcing plates on the reduced end portion of the hub 24 as shown, and to then hob or cut the teeth on the assembled elements, the reinforcing plates during this operation, acting to prevent deformation of the laminations and the teeth cut thereon by the hob or gear cutter. When the teeth of the laminations 26 and the plates 28 and 29 are formed in this manner, the said plates are initially of the same external diameter as the laminations, but after the teeth have been cut the outer or reinforcing plates 28 and 29 are turned down to the diameter shown.

While I have described my invention as applied to a worm gear, it is understood that the same is applicable to other types of gears. Furthermore, while my gear is especially designed for use in conjunction with phonographs or mechanisms of a similar sensitive nature, its use is not limited thereto. Also the specific form of gear shown and described herein is subject to various changes in the size, shape and arrangement of parts without departure from the spirit of the invention or the scope of the appended claims.

Having now described my invention, what I claim as new and desire to protect by Letters Patent is as follows:

1. A gear wheel comprising a body portion made up of a plurality of peripherally toothed plates or laminations rigidly secured together at their central portions so as to be incapable of relative bodily rotary movement, and with the outer portions free but contiguous, and a pair of reinforcing plates respectively disposed at the sides of said body portion, one of said reinforcing plates having teeth corresponding to and registering with but of less height than the teeth of the adjacent lamination, substantially as described.

2. A gear wheel comprising a body portion made up of a plurality of peripherally toothed plates or laminations rigidly secured together at their central portions so as to be incapable of relative bodily rotary movement, and with the outer portions free but contiguous, and a pair of reinforcing plates respectively disposed at the sides of said body portion, the outer portions of said reinforcing plates having teeth corresponding to and respectively registering with the teeth of the adjacent laminations, the teeth of the reinforcing plates being of less height than the teeth of the laminations, substantially as described.

3. A gear wheel comprising a body portion made up of a plurality of peripherally toothed plates or laminations rigidly secured together at their central portions so as to be incapable of relative bodily rotary movement, and with the outer portions free but contiguous, and a pair of reinforcing plates respectively disposed at the sides of said body portion, the outer portions of said reinforcing plates being slightly spaced from the adjacent laminations, and one of said reinforcing plates being provided with teeth corresponding to and respectively registering with the teeth of the adjacent lamination, substantially as described.

4. A gear wheel comprising a body portion made up of a plurality of peripherally toothed plates or laminations rigidly secured together at their central portions so as to be incapable of relative bodily rotary movement, and with the outer portions free but contiguous, and a pair of reinforcing plates respectively disposed at the sides of said body portion, the outer portions of said reinforcing plates being slightly spaced from the adjacent laminations, and one of said reinforcing plates being provided with teeth corresponding to and registering with but of less height than the teeth of the adjacent lamination, substantially as described.

5. A gear wheel comprising a body portion made up of a plurality of superposed thin, flat, circular plates or laminations, teeth formed in the peripheral portions of said superposed plates, and reinforcing plates respectively disposed at the sides of said body portion, the central portions of the adjacent reinforcing plates and laminations being contiguous and rigidly secured together so as to be incapable of relative bodily rotary movement, the outer portions of the laminations being free but contiguous, and the outer portions of the reinforcing plates being free and slightly spaced from the adjacent laminations, substantially as described.

6. A worm gear comprising a hub, a body portion made up of a plurality of superposed thin, flat, circular plates or laminations, worm teeth formed in the peripheral portions of said laminations, reinforcing plates respectively disposed at the sides of said body portion, the reinforcing plates and laminations being rigidly secured together and keyed to the hub at their central portions so as to be incapable of bodily rotary movement with respect to each other and with respect to the hub, the outer portions of the laminations being free but contiguous, and the outer portions of the reinforcing plates being free and spaced from the adjacent laminations, substantially as described.

This specification signed this 9th day of November, 1920.

CHARLES W. LUHR.